(12) United States Patent
Saxena et al.

(10) Patent No.: US 10,771,919 B2
(45) Date of Patent: *Sep. 8, 2020

(54) MICRO POINT COLLECTION MECHANISM FOR SMART ADDRESSING

(71) Applicant: HERE Global B.V., Eindhoven (NL)

(72) Inventors: Deekshant Saxena, Mumbai (IN); Senjuti Sen, Manpada (IN)

(73) Assignee: HERE Global B.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 16/601,734

(22) Filed: Oct. 15, 2019

(65) Prior Publication Data

US 2020/0204949 A1  Jun. 25, 2020

Related U.S. Application Data

(63) Continuation of application No. 16/229,124, filed on Dec. 21, 2018, now Pat. No. 10,484,822.

(51) Int. Cl.
| | |
|---|---|
| *H04W 24/00* | (2009.01) |
| *H04W 4/02* | (2018.01) |
| *G10L 25/51* | (2013.01) |
| *G06F 16/29* | (2019.01) |
| *G01S 5/18* | (2006.01) |
| *G01C 21/34* | (2006.01) |
| *H04W 4/029* | (2018.01) |
| *G01C 21/20* | (2006.01) |
| *H04W 4/024* | (2018.01) |

(52) U.S. Cl.
CPC .......... *H04W 4/023* (2013.01); *G01C 21/206* (2013.01); *G01C 21/343* (2013.01); *G01S 5/18* (2013.01); *G06F 16/29* (2019.01); *G10L 25/51* (2013.01); *H04W 4/024* (2018.02); *H04W 4/025* (2013.01); *H04W 4/029* (2018.02)

(58) Field of Classification Search
USPC ........................ 455/456.1, 41.1; 340/6.1, 5.7
See application file for complete search history.

(56) References Cited

U.S. PATENT DOCUMENTS

| | | | |
|---|---|---|---|
| 7,750,814 B2 | 7/2010 | Fisher et al. | |
| 8,830,792 B2 | 9/2014 | Taylor | |
| 8,862,146 B2 | 10/2014 | Shatsky | |
| 9,170,325 B2 | 10/2015 | Zhang | |
| 9,812,152 B2 | 11/2017 | Christian | |
| 9,854,148 B2 | 12/2017 | Tredoux et al. | |
| 2013/0057695 A1* | 3/2013 | Huisking | H04N 7/186 348/156 |
| 2014/0049361 A1* | 2/2014 | Ahearn | G07C 9/00309 340/5.7 |
| 2014/0051355 A1* | 2/2014 | Ahearn | G07C 9/00174 455/41.1 |
| 2014/0070922 A1* | 3/2014 | Davis | H04M 11/025 340/6.1 |

(Continued)

*Primary Examiner* — David Q Nguyen
(74) *Attorney, Agent, or Firm* — Lempia Summerfield Katz LLC

(57) ABSTRACT

A micro point address is detected in response to an audio trigger. Audio data is detected at a mobile device and compared to at least one predetermined audio sample. In response to the comparison, location data is collected or a location stamp including the location data is made. A grid location identifier is stored in association with the location data in response to the comparison.

20 Claims, 10 Drawing Sheets

(56) References Cited

U.S. PATENT DOCUMENTS

| | | |
|---|---|---|
| 2014/0267906 A1 | 9/2014 | Mickelsen |
| 2015/0341890 A1 | 11/2015 | Corbellini |
| 2015/0358768 A1 | 12/2015 | Luna |
| 2016/0173440 A1 | 6/2016 | Stahura |
| 2016/0373909 A1 | 12/2016 | Rasmussen |
| 2017/0064261 A1* | 3/2017 | Peng ................ H04N 7/186 |
| 2017/0116835 A1* | 4/2017 | Child ................ H04N 7/183 |
| 2017/0164150 A1 | 6/2017 | Cudzilo |
| 2017/0225921 A1 | 8/2017 | Scoville |
| 2018/0049213 A1 | 2/2018 | Gholmieh |
| 2018/0234531 A1* | 8/2018 | Ekkel ............... H04M 1/0291 |
| 2018/0247253 A1* | 8/2018 | Duquene ........... G06F 21/604 |
| 2018/0252589 A1* | 9/2018 | Fadell ............... H02J 13/0013 |
| 2018/0255429 A1 | 9/2018 | Hazlewood et al. |
| 2018/0302747 A1 | 10/2018 | Anderson |
| 2018/0350021 A1 | 12/2018 | Pedawi |
| 2019/0052747 A1 | 2/2019 | Breaux |
| 2019/0304274 A1* | 10/2019 | Britton ............. G08B 13/19656 |
| 2019/0327448 A1* | 10/2019 | Fu .................... H04N 7/181 |

\* cited by examiner

MICRO POINT COLLECTION MECHANISM FOR SMART ADDRESSING

CROSS REFERENCE TO PRIOR APPLICATION

This application is a continuation under 35 U.S.C. § 120 and 37 C.F.R. § 1.53(b) of U.S. patent application Ser. No. 16/229,124 filed Dec. 21, 2018, which is hereby incorporated by reference in its entirety.

FIELD

The following disclosure relates to the detection of addresses or micro point locations, and more particularly to the detection of addresses or micro point locations in response to audio triggers.

BACKGROUND

Map databases may be used to provide navigation based features such as routing instructions for an optimum route from an original location to a destination location and map based features such as section and display of maps to manually locate locations or points of interest. Map databases are used in vehicle, driver assistance systems and pedestrian or indoor routing systems.

Conventional procedures for map building are resource intensive. It requires human operators as map coders to manually pinpoint certain locations in the map. The amount of human input efforts increases dramatically with higher resolution maps with higher definition requirements. Conventional map coding procedures are neither cost efficient nor turnaround optimized. Collection of information about may require specialized systems, precise measurements and manual input to correctly represent venues. As the resolution of available maps and the accuracy of positioning services increase, the need for a more precise pairing of coordinates and addresses increases as well.

SUMMARY

In one embodiment, a method for micro point address detection in response to an audio trigger includes receiving audio data at a mobile device, receiving location data for the mobile device, performing, using a processor, a comparison the audio data to at least one predetermined audio sample, and associating the location data with a grid location identifier in response to the comparison.

In another embodiment, an apparatus for micro point address detection in response to an audio trigger includes at least an audio sensor, position circuitry, and a controller. The audio sensor is configured to collect audio data. The position circuitry is configured to collect location data. The controller is configured to perform a comparison the audio data to at least one predetermined audio sample and store a grid location identifier in association with the location data in response to the comparison.

In another embodiment, the non-transitory computer readable medium including instructions that when executed by a processor are configured to perform storing coordinates for a micro point address in a map database, wherein the coordinates are collected in response to audio collected and matched to a predetermined template, receiving a routing request including the micro point address, querying the map database according to the micro point address to access coordinates associated with the micro point address, and providing a route to the micro point address using the coordinates from the database.

BRIEF DESCRIPTION OF THE DRAWINGS

Exemplary embodiments of the present invention are described herein with reference to the following drawings.

DETAILED DESCRIPTION

Many addresses may be directly coded to a geographic location (e.g., latitude and longitude pair) when each building includes a single address. Geocoding and reverse geocoding are the processes for converting between addresses and geographic locations, and vice versa. Along a road, houses that are spaced tens of meters apart are easily distinguished using a global navigation satellite system (GNSS). However, when addresses are closer together, the addresses may not be easily distinguished. For example, townhouses may share walls and be too closely positioned to one another to be distinguished reliably through the GNSS. In addition, in an apartment building, the apartments may be positioned along internal hallways as well as different floors.

The following embodiments collect micro point addresses that improve the geocoding and reverse geocoding processes. Micro point addresses may represent apartments, suites, floors or other addresses that share a building or other geographic location (e.g., campus or group of buildings). The use of doorbell sound for micro point address collection may be similar to the remote sensing and spatial science principles of reverse geocoding and generation of localized grid for reference address to generate the location of the door and formulate the micro point address. The following embodiments may collect location data that is tied to the micro point address through GNSS or other positioning technologies. The location data collection, or association of the location data with the micro point address, may be initiated in response to an audio trigger. The audio trigger may be a doorbell. In some embodiments, a delivery device such as a proof of delivery or other handheld computer configured to assist in the delivery of packages. A delivery device may perform verification of micro point addresses previously collected by user devices. In other embodiments, user devices may be configured to perform verification of micro point addresses previously collected by delivery devices The following embodiments relate to several technological fields including but not limited to navigation, pedestrian navigation, indoor navigation, assisted driving, and other location-based systems. The following embodiments achieve advantages in each of these technologies because the underlying geographic database is improved through the addition of micro point addresses. Moreover, with a more complete geographic database, the accuracy, effectiveness, efficiency, and speed of specific application in these location-based technologies. In each of the technologies of navigation, autonomous driving, and other location-based systems, identification of micro point addresses improves the technical performance of the application. In addition, users of navigation, autonomous driving, and other location-based systems are more willing to adopt these systems given the technological advances in the geographic database including micro point addresses.

Figure 1:
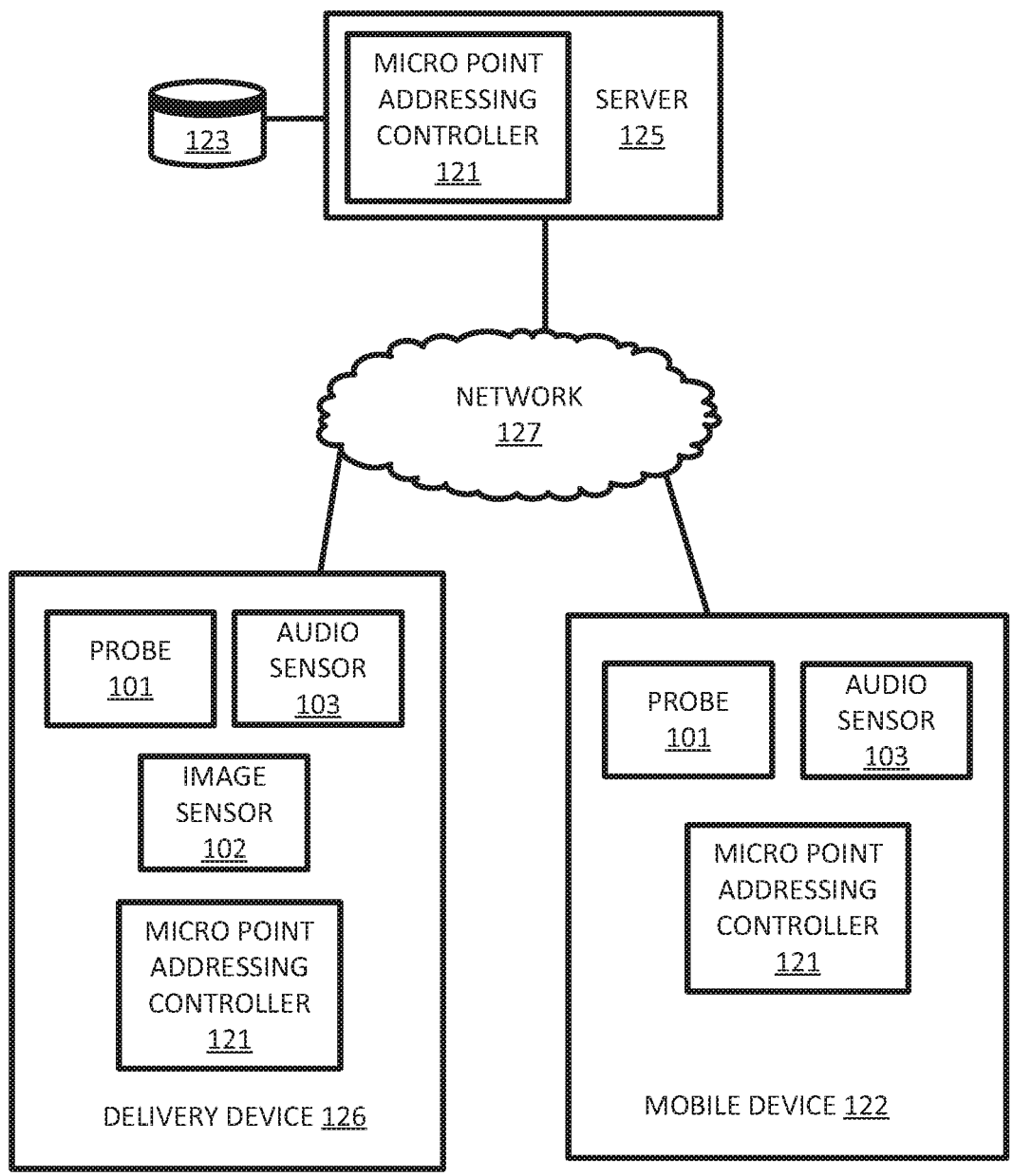
FIG. 1 illustrates an example system for micro point address collection.

FIG. 1 illustrates an example system for micro point address collection. In FIG. 1, one or more mobile devices 122 are connected to the server 125 though the network 127. Either or both of the mobile device 122 and the server 125 may include a micro point addressing controller 121 specialized for the identifications one or more micro point addresses in response to sensor data. The mobile device 122 may include a probe 101 and an audio sensor 103. In some embodiments, the identification of the one or micro point address is performed by the server 125 and in other embodiments, the identification is performed is performed by the mobile device 122.

The audio sensor 103 may include a microphone. The audio sensor 103 may be the microphone of the phone included in the mobile device 122 as a smartphone. The audio sensor 103 may be a dedicated microphone (e.g., a secondary microphone) that is configured for the detection of doorbells. The audio sensor 103 may be specialized for a particular frequency or range of frequencies. The audio sensor 103 may be included in an audio detection circuit. The audio detection circuit may include an amplifier tuned (e.g., with a combination of resistors) for the range of frequencies.

The doorbell may produce a harmonic sound. The range of frequencies from one harmonic may be 500 Hz to 2000 Hz and additional harmonics may be at higher frequencies. The audio sensor 103 may detect a sequence of particular tones or frequencies in the range of frequencies. The sequence of particular tones or frequencies may correspond to a sequence of a particular model of doorbell. The audio sensor 103 may detect sounds in multiple harmonics and the presence of sounds in multiple frequency ranges may correspond to a particular model of doorbell.

In addition or in the alternative to the audio sensor 103, mobile device 122 may include a radio frequency sensor. The radio frequency sensor may be in communication with an antenna. The radio frequency sensor may determine a frequency value or a spectrum range for a wireless signal including data representing the doorbell. The wireless signal may be triggering a remote doorbell. That is, the wireless signal may be sent from a doorbell transmitter. The frequency value may include an ultra high frequency value (e.g., 868 MHz) or a low frequency value (e.g., 40 kHz). The frequency value may be higher than the audible range for hearing.

The probe 101 may include circuitry for determining the location of the mobile device 122. The probe 101 may output sensor data as location data. The probe 101 may receive signals from a GNSS. The probe 101 may include other positioning techniques such as positioning based on wireless radio signals received from one or more other devices. The positioning may be based on a received signal strength indicator (RSSI) measured at the mobile device 122. The RSSI may decrease proportionally to the square of the distance from the source of the signal. The positioning technique may analyze cellular signals received from multiple towers or cells. Position may be calculated from triangulation of the cellular signals. Several positioning techniques may be specialized for indoor applications such as pseudolites (GPS-like short range beacons), ultra-sound positioning, Bluetooth Low Energy (BTLE) signals (e.g. High-Accuracy Indoor Positioning, HAIP) and WiFi-Fingerprinting.

The geographic database 123 may include a grid system, described in more detail below, that partitions geographic areas according to a uniform grid of cells with boundaries tied to geographic coordinates. The cells may be sized to a predetermined size selected such that approximately one, or at most one, micro point address is included in each cell. One examples cell size may be 1 meter squared. A map developer system, including the server 125 and a geographic database 123, exchanges (e.g., receives and sends) data from the mobile devices 122. The mobile devices 122 may include local databases corresponding to a local map, which may be modified according to the server 125. The local map may include a subset of the geographic database 123 and are updated or changed as the mobile devices 122 travel. In some embodiments the local maps are modified according to data collected by the mobile device 122. In other embodiments, the collected data is transferred to the server 125 for augmenting the geographic database 123. Additional, different, or fewer components may be included.

A delivery device 126 is specialized type of mobile device 122. The delivery device 126 may be a handheld computer including one or more hardware components specialized for the delivery of packages. The delivery device 126 may include a scanner (e.g., optical sensor 102) for scanning a package to obtain the address of the destination of the package. The delivery device 126 may include an input device (e.g., touchscreen) for signature collection. The delivery device 126 may include a communication adaptor to communicate with delivery service servers through the network 127 or another network. In addition, the mobile device 122 may be a smartphone running software that allows it to function as the delivery device 126 (scan of addresses per camera, signature collection over touchscreen, connection to delivery service servers via communications adapter). In some examples, the image sensor 102 may be omitted, and packages to be delivered and their corresponding addresses may also be displayed individually to the delivery person via the user interface of the mobile device 122.

Each mobile device 122 may include position circuitry such as one or more processors or circuits for generating probe data. The probe data may be generated by receiving GNSS signals and comparing the GNSS signals to a clock to determine the absolute or relative position of the mobile device 122. The probe data may be generated by receiving radio signals or wireless signals (e.g., cellular signals, the family of protocols known as WiFi or IEEE 802.11, the family of protocols known as Bluetooth, or another protocol) and comparing the signals to a pre-stored pattern of signals (e.g., radio map). The mobile device 122 may act as probe 101 for determining the position or the mobile device 122 and the probe 101 may be separate devices.

Each mobile device 122 may include an optical sensor 102 such as a camera or charge coupled device (CCD) configured to detect and collect data for the surroundings of the mobile device 122. The camera or other sensor data may be coupled with image processing circuitry to analyze the data. The optical sensor 102 may be a visible spectrum camera, an infrared camera or sensor, a laser scanner, an ultraviolet camera or another camera. The optical sensor 102 may be a barcode or quick response (QR) reader. As an alternative or addition to the optical sensor 102, a radio frequency identification (RFID) reader may be included in the mobile device 122.

Each image or audio measurement may be associated with or stored with a timestamp and/or a location stamp based on the time and location that the data was collected. The probe data forming the location stamp may include a geographic location such as a longitude value and a latitude value. In addition, the probe data may include a height or altitude. The probe data may be collected over time and include timestamps. In some examples, the probe data is collected at a predetermined time interval (e.g., every second, ever 100 milliseconds, or another interval). In some examples, the probe data is collected in response to movement by the probe 101 (i.e., the probe reports location information when the probe 101 moves a threshold distance). The predetermined time interval for generating the probe data may be specified by an application or by the user. The interval for providing the probe data from the mobile device 122 to the server 125 may be may the same or different than the interval for collecting the probe data. The interval may be specified by an application or by the user.

Communication between the mobile device 122 and the server 125 through the network 127 may use a variety of types of wireless networks. Example wireless networks include cellular networks, the family of protocols known as WiFi or IEEE 802.11, the family of protocols known as Bluetooth, or another protocol. The cellular technologies may be analog advanced mobile phone system (AMPS), the global system for mobile communication (GSM), third generation partnership project (3GPP), code division multiple access (CDMA), personal handy-phone system (PHS), and 4G or long term evolution (LTE) standards, 5G, DSRC (dedicated short range communication), or another protocol.

Figure 2:
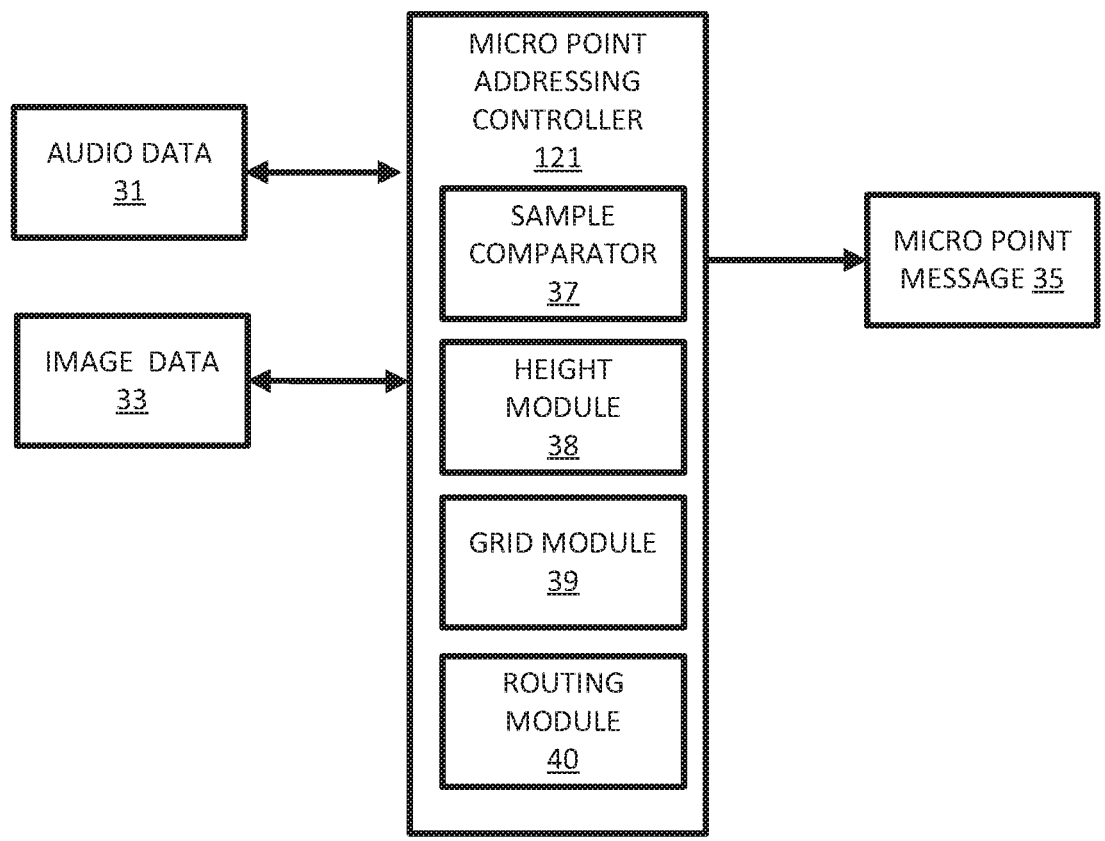
FIG. 2 illustrates an example micro point addressing controller.
Figure 3:
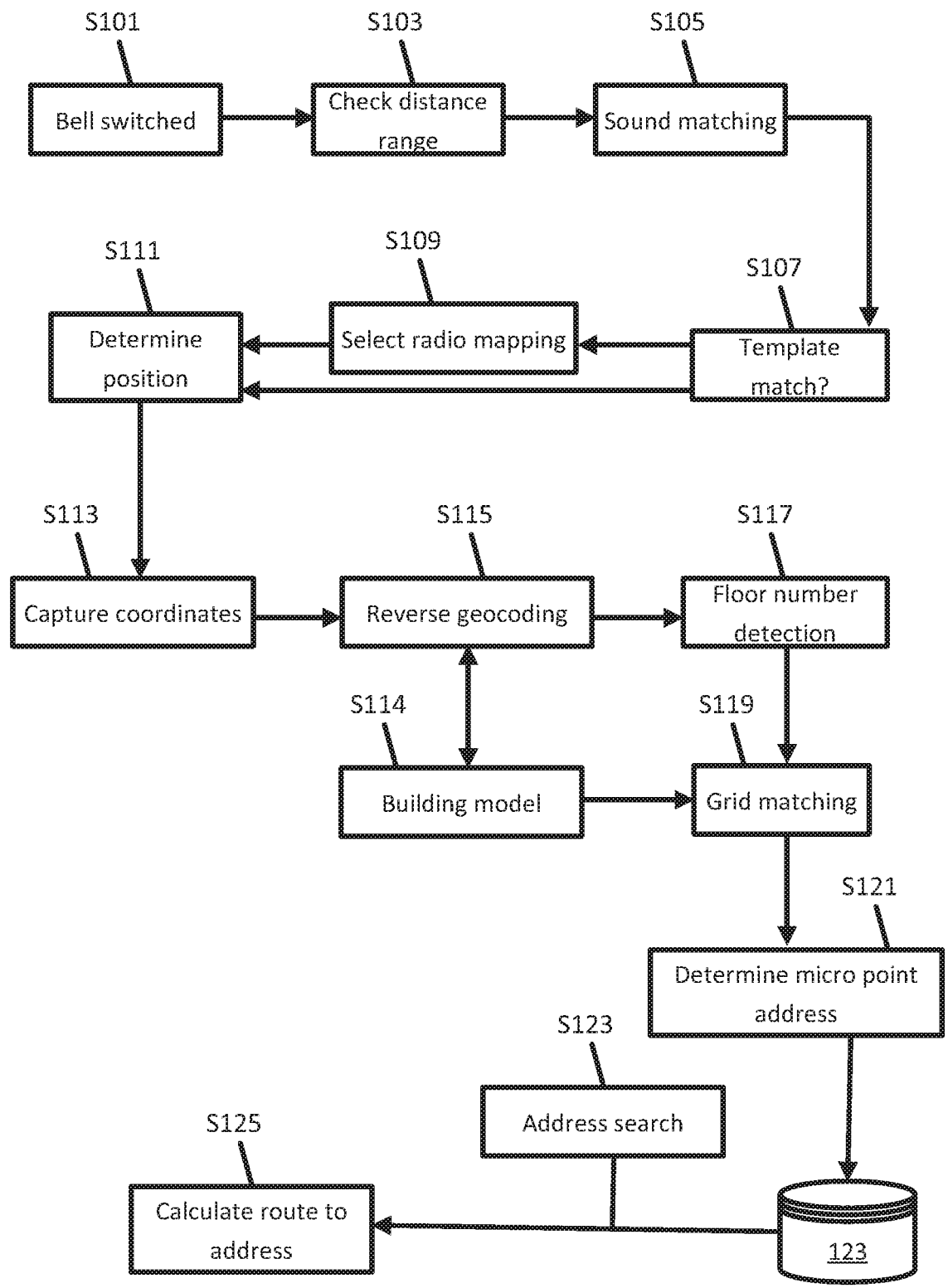
FIG. 3 illustrates an example flow chart for micro point address collection.

FIG. 2 illustrates an example micro point addressing controller 121, which may be implemented by the server 125, the mobile device 122, or a combination thereof. In one example, the acts S101-S113 are performed by the mobile device and acts S115-S125 are performed by the server 125. The micro point addressing controller 121 as described may include components at both the mobile device 122 and the server 125.

The micro point addressing controller 121 may include multiple components including a sample comparator 37, a height module 38, a grid module 39, and a routing module 40. The micro point addressing controller 121 may implement these modules though specialized hardware and software components. Additional, different, or fewer components may be included.

At S101, the doorbell is pressed or another sound is switch on or activated. The doorbell or other sound results in the audio data 31 received at the micro point addressing controller 121. The audio data 31 may be received directly at the mobile device 122 through the audio sensor 103. The audio data 31 may be received at the server 125 via the mobile device 122. The audio data 31 may include a sound file (e.g., MP3, wave, or another sound type). The audio data 31 may include that data that describes characteristics of a sound such as amplitude, frequency, or wavelength. The audio data 31 may describe a doorbell. The audio data 31 may describe the sound radiated by a doorbell at a frequency on which doorbells work, be it on an audible frequency or a transmitted frequency. The emitted sound or signal is detected by the mobile device 122 (e.g., smartphone).

The doorbell is an example of an active sonar device for the purpose of micro point address collection. Different doorbell sounds may exist in different buildings, which are recognizable as doorbell using reference sound samples. As the doorbell is rung, the sound may be detected by the mobile device 122.

In one alternative, the doorbell may be a smart doorbell configured to transmit data messages wirelessly. The data messages may include an identifier for the doorbell such as a code for the type of doorbell and a code for the address of the doorbell. The address of the doorbell may be manually programmed during the installation of the smart doorbell. The data messages may be broadcast to any devices in the vicinity of the smart doorbell. The vicinity of the smart doorbell may be a range of short range communication technologies such as Bluetooth, near field communication, or WiFi. The data messages may be transmitted through the network 127.

At act S103, the distance range is checked. The micro point addressing controller 121 analyzes the audio data 31 to determine whether the source of the sound (e.g., doorbell) is within a distance range of the mobile device 122, or whether the door is within a distance range of the mobile device 122. The distance range may be a specific values such as 5 meters, but also may be an estimate or range of distances. In some examples, the micro point addressing controller 121 receives sounds corresponding to multiple doorbells and determines which, if any, of the doorbells meet the distance range. The audio data 31 associated with doorbells that do not meet the distance range may be discarded. The micro point addressing controller 121 may compare the amplitude or intensity of the audio data 31 with a predetermined threshold in order to determined whether the source of the sound is in the distance range of the mobile device 122. When the at least one sound in the audio data 31 meets the threshold for distance, the micro point addressing controller 121 proceeds to perform sound matching.

At act S105, sound matching is performed. The micro point addressing controller 121 is configured to perform a comparison the audio data to at least one predetermined audio sample. For example, the sample comparator 37 is configured to identify samples of the audio data 31. The samples may be a value that is stored every predetermined time interval to represent the sound of the doorbell. The sample comparator 37 may compare the sample values to a template for a source of the audio. The template may include a series of template values for the frequency, amplitude or wavelength of the doorbell. The micro point addressing controller 121 may store different templates or different values for different types of doorbells. Thus, the template may include multiple templates for multiple types of doorbells.

In one example, the mobile device 122 includes a mobile application that implements the sample comparator 37. The mobile application may be triggered open in response to the audio data 31 and the mobile application compares the produced sound with already built in sample sounds or templates. In one example, the sample comparator 37 may be implemented by a Python package such as Audio Py that performs the comparison to the sample sounds.

In one example, the sample comparator 37 may perform a fast Fourier transform on the audio data 31 to generate a frequency domain value that represents the frequency of the doorbell. The frequency domain value may represent the power of the signal for the audio data 31 at a specific range of frequencies. The sample comparator 37 may generate multiple frequency domain values for different ranges of frequencies. The frequency domain values may be compared to a template of frequency values that correspond to one or more types of doorbells.

In one alternative, a neural network may be implemented as at least a part of the sample comparator 37. The neural network may include a training phase and a classification stage. In the training stage, previously recorded audio samples with known identities are provided to the neural network. The known identities may indicate whether or not the previously recorded audio samples include doorbells or not. The known identities may indicate particular types of doorbells.

The micro point addressing controller 121 may also identify and store new templates for doorbells. The new doorbell may be identified by another input that indicates a doorbell has sounded such as a manual input from the user or a message from a smart doorbell. The micro point addressing controller 121 records the audio data 31 in response to receiving the other input that indicates a doorbell has sounded.

At act S107, the micro point addressing controller 121 (e.g., the sample comparator 37) determines whether the audio data 31 matches the predetermined template, for example, as the result of the comparison in act S105. When the audio data 31 matches one or more templates, the micro point addressing controller 121 determines a match and that the audio data 31 corresponds to a doorbell. In response, the micro point addressing controller 121 proceeds to radio mapping (S109) or other position detection (S111). That is, when the audio data 31 and the template match is accurate enough to register as a doorbell, it will trigger the positioning components of the mobile device 122 to perform indoor positioning or capture latitude and longitude of the point the where phone is.

At act S109, the micro point addressing controller 121 selects radio mapping. The radio mapping may include one or more indoor positioning techniques. The radio mapping may include the detection of signal strength from one or more transmitters. The transmitters may include cellular, Wifi, or another communication signal for the mobile device 122. The radio mapping may include detection of one or more mesh beacons. The mesh beacons may be pseudolites, Bluetooth, and Bluetooth Low Energy (BTLE). The radio mapping may determine latitude, longitude and height.

The height may be determined from the indoor positioning technique. The height may be based on the detection of signal strength from one or more transmitters. Alternatively, the height may be detected using another sensor such as a pressure sensor or altimeter. In one example, the height determined by the indoor positioning technique may be a relative height that is measured from a previous height. The previous height may be the last known (e.g., high confidence level) height measured by GNSS. The GNSS height measurement may have a high confidence level in the outdoors and/or outside of urban canyons or other obstructions or causes of multipath. A pressure measurement is recorded by the micro point addressing controller 121 at the high confidence level for GNSS. Subsequent pressure measurements are measured in reference to the first pressure measurement to track the height changes of the mobile device 122.

The indoor positioning technique or other measurements described with respect to act S109 may be referred to as a first positioning determination, and the second positioning technique may be performed at act S111.

At act S111, the micro point addressing controller 121 determines position. The mobile device 122 may determine a location associated with the sound capture for the audio data 31 according to an available positioning methods such as GNSS (e.g. GPS, Galileo, Beidou, GLONASS, etc.). The location may be described by location data including coordinates such as longitude and latitude. The location data may be used to retrieve the corresponding 2D building footprint or 3D model, to which the micro point address will be applied, as described further herein. The server 125 may determine position based on location data received from the mobile device 122.

At act S113, the micro point addressing controller 121 captures coordinates based on the first positioning determination and/or the second positioning determination. The coordinates may include a latitude, longitude, and height or altitude. The coordinates are captured in response to the determination that a doorbell has sounded (i.e., from the template matching at act S107). In other words, in some embodiments the micro point addressing controller 121 continuously or intermittently collects and/or calculates location data based on the first positioning determination and/or the second positioning determination and captures a specific set of coordinates at act S113 when the doorbell has sounded.

At act S115, returning to the example in which the geographic coordinates are determined from location detection in act S113, the micro point addressing controller 121 performs reverse geocoding. Geocoding and reverse geocoding may translate between the global coordinate system (e.g. WGS 84) and the addressing systems, which vary depending on the local area. The WGS 84 system has an origin located at the center of mass of the Earth. The surface of the WGS 84 system is a spheroid, which may be sphere-like but not perfect spherical.

Latitude and Longitude registered by the positioning component may be reverse geocoded by the micro point addressing controller 121. In one example, the mobile device 122 may execute a map provider application programming interface (API) that is provided by the server 125. The reverse geocoding queries an address database, which may be included in database 123, using the geographic coordinates to return an address. The reverse geocoding may return the nearest address, which may be limited according to a distance buffer. Example distance buffers may be 50 meters, 100 feet, or 100 meters.

While the reverse geocoding may be performed in response to the audio data 31 indicating that the doorbell has sounded, the reverse geocoding may be performed using previously captured geographic coordinates. In one embodiment, the mobile device 122 may execute multiple map provider APIs, which may be provided by different servers or map providers. None of the returned addresses may match the detected geographic coordinates exactly. The micro point addressing controller 121 may compare the distances between the geographic coordinates detected and the coordinates for the returned addresses. The micro point addressing controller 121 may determine a best match from the multiple addresses returned by the multiple map provider APIs.

The address returned from the reverse geocoding may associated with a building model that is accessed at act S114. The building model may describe a footprint of a building for the address. The footprint may include the dimensions of a two-dimensional representation of the building. The building model may describe one or more floors of a building with similar footprints that may be different from one another. The building model may include floor plans for one or more floors of the building that include dimensions of individual rooms or other spaces on the floor.

Figure 4:
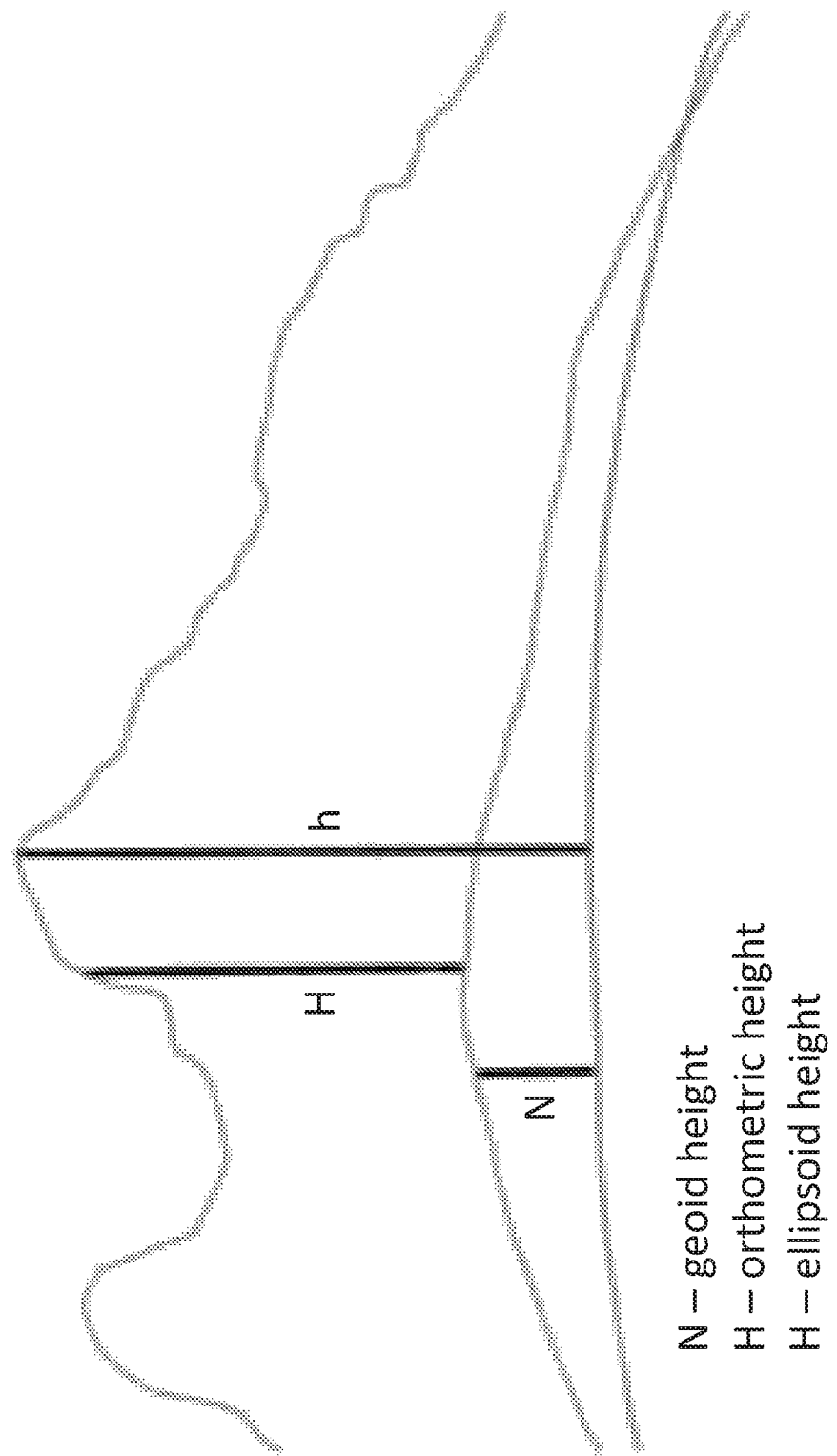
FIG. 4 illustrates an example height calculation for the micro point address collection.

FIG. 4 illustrates an example height calculation for the micro point address collection. The ellipsoidal reference altitude (h) is determined direction as the height or altitude from the first positioning determination (e.g., S109) or the second positioning determination (e.g., S111). The geoid height (N) is a height assigned to a coordinate pair for the surface of the Earth, or deviation from a perfect sphere. The height (H) of the coordinates for the building is calculated based on a difference between the ellipsoidal reference altitude and the geoid height, according to equation 1.

$$H=h-N \qquad \text{Eq. 1}$$

In other words, the altitude or height collected by the mobile device 122 is compared with a reference ellipsoid to correct the altitude or height with the geoid height to calculate the height of the building from mean sea level.

At act S117, the micro point addressing controller 121 performs floor number detection. In one example, the micro point addressing controller 121 first queries the geographic database 123 to determine whether a building model that is accessed at act S114, if applicable, includes the number of floors. If the number of floors has been determined, act S117 is omitted. Otherwise, the height module 38 calculates the number of floors based on the height (H) for the coordinates for the building. The micro point addressing controller 121 may access a story value that corresponds to an average height or expect height for the building. The story value maybe determined according to the type of building. That is, residential buildings may be assigned a residential story value, commercial buildings may be assigned a commercial story value, and industrial buildings may be assigned an industrial story value. In one example, the industrial story value is greater than the commercial story value, and the commercial story value is greater than the residential story value.

The story value may vary according to geographical area. Different countries, regions, or other areas may have different story values. That is, the average residential height in one country or region may be different than the average residential height in another country or region. The story value may vary according to historical periods. For example, one time period or era may be assigned a first story value, and another time period or era may be assigned a second story value.

Example story values, which may be specific to building type, geographic region, and/or time period, may include 3 meters, 10 feet, 5 meters, 15 feet, or another value. The micro point addressing controller 121 may access the story value from the building model or another database. The story value may be a field stored with specific buildings or areas in the building model.

The micro point addressing controller 121 may calculate the floor number (F) according to Equation 2, based on the story value (c) and the and the height (H) of the coordinates for the building. The story value may be scaled according to geographic region, building type, or time period, as described above. The floor number may be the number for the quantity for the floors in the building.

$$F=H/c \qquad \text{Eq. 2}$$

In one alternative, the radio mapping, or first position determination may determine floor number directly at act S109. That is, the radio mapping may determine a reliable floor number based on the indoor positioning technique.

Figure 5:
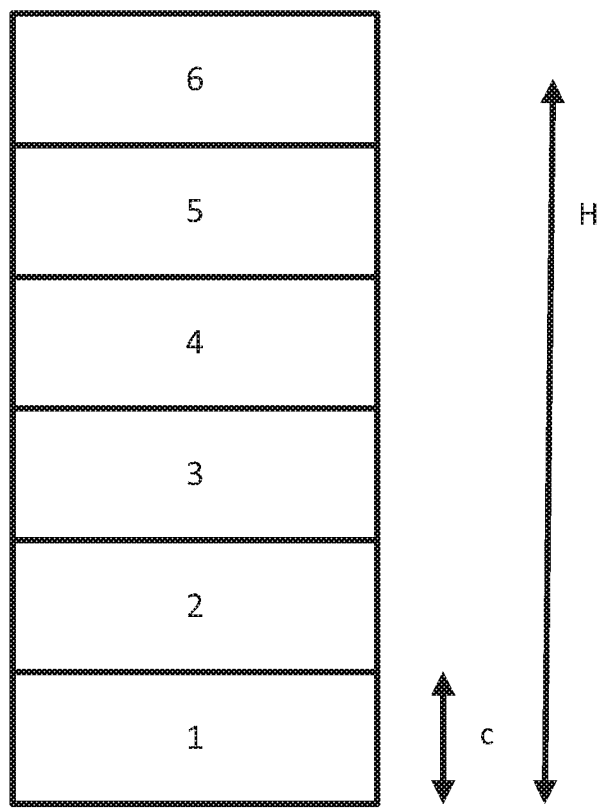
FIG. 5 illustrate an example floor calculation for the micro point address collection.

At act S117, the micro point addressing controller 121 performs floor number detection by associating the geographic coordinates captured at the first positioning determination or the second positioning determination with its floor number. FIG. 5 illustrates an example floor calculation for the micro point address collection. The height of the building from the coordinates captured in response to the doorbell sound is 60 feet. The number of floors is 6 based on the story value of 10 feet. Hence, the coordinates captured are associated with the 6th floor.

At act S119, the micro point addressing controller 121 performs grid matching. The grid module 39 is configured to access a grid including a two-dimensional footprint of at least one building from the building model and assign the micro point address to the two-dimensional footprint in response to the location data. The grid module 39 may determine a grid identifier for a cell of the grid. The grid may be accessed from the geographic database 123 as associated with building model that is accessed at act S114. The grid may be accessed from the geographic database 123 according to the geographic coordinates determined at act S111. In some examples, the mobile device 122 retains the last collected GNSS coordinates, for example before entering a building, and the last collected GNSS coordinates are used to access the grid in response to the template match. In other examples, the mobile device 122 collects geographic coordinates near the location of the sound detection, which may be through indoor positioning (e.g., radio map or beacon detection). The gird module 39 associates the location data with the grid location identifier in response to the sound detection of the doorbell.

At act S121, the micro point addressing controller 121 may determine the micro point address, which may be assigned to the cell of the grid in geographic database 123. The micro point address may be determined from an external source. For example, in response to the sound detection and match at act S107, the current or last high confidence position is determined at act S111. From the position, the micro point addressing controller 121 accesses a grid or a cell from the grid with a grid identifier. In some examples, indoor positioning is also used to select the cell from the grid. The micro point addressing controller 121 may initially store the grid identifier along with the position. In addition, the micro point addressing controller 121 may determine the micro point address (e.g., room, apartment, or suite number) from another source, and the micro point address is stored along with the grid identifier and/or the position in the geographic database 123.

In one alternative to act S113, an image or optical scan is collected in response to detected of the doorbell sound. When the audio data 31 matches the template, as determined in act S107, the image sensor 102 collects the image data 33. The micro point addressing controller 121, or otherwise the server 125, analyzes the image data 33 to identify the micro point address.

As an alternative to image processing techniques, the micro point address may be determined from a user input. That is, in response to the template match in act S107, the micro point addressing controller 121 may prompt the user to enter the micro point address or a component of the micro point address that specifies the unit number, suite number, or room number. The micro point address may be determined from a package delivery, which is discussed in more detail below.

As another alternative to the image processing techniques, the mobile device 122 may collecting sensor data at the mobile device 122 from an external source. The external source may be a radio, inductive, or magnetic signature of a package such as radio frequency identification. The micro point addressing controller 121, at the mobile device 122 or the server 125, may extract the micro point address from the sensor data or lookup the micro point address based on the sensor data. The detection and analysis of the sensor data may be made in response to the comparison of the sound data of the doorbell.

Figure 6:
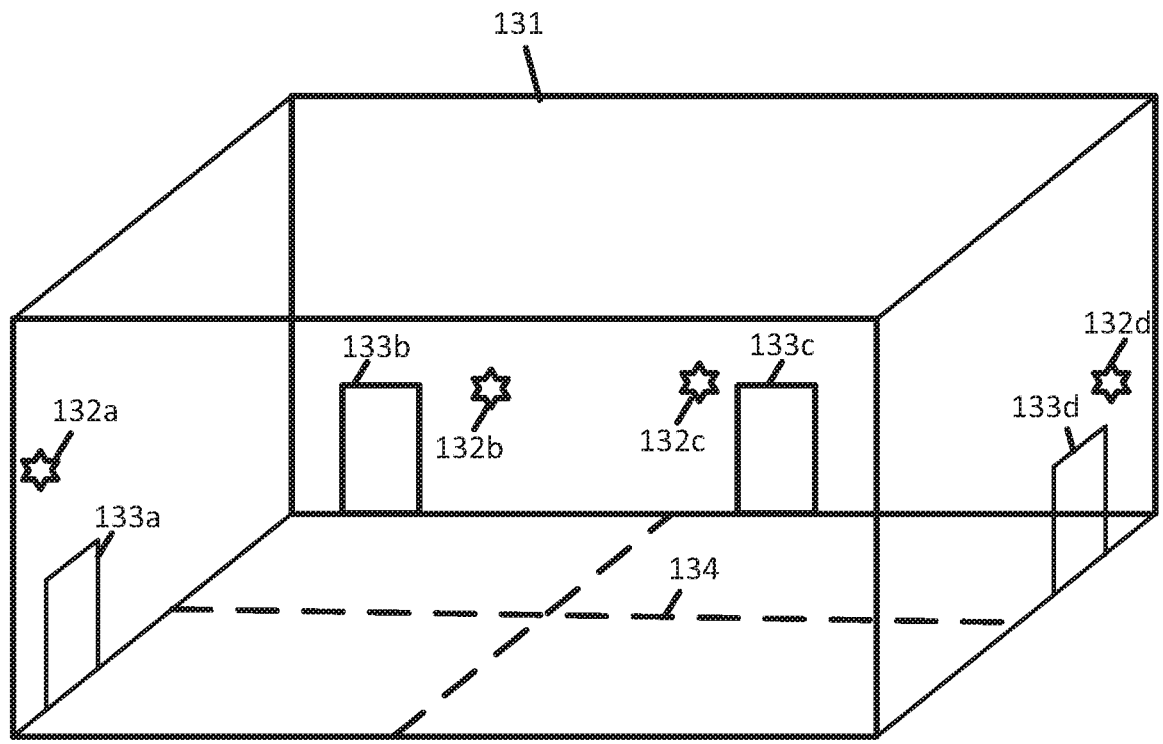
FIG. 6 illustrates an example building for micro point address collection.

FIG. 6 illustrates an example building 131 for micro point address collection for visualizing the grid. The points 132*a-d* are the coordinates that are captured in response to the doorbell sounds produced for doors 133*a-d*, respectively. For example, the doorbell that sounds for door 133*c* triggered geographic coordinates at point 132*c*. A grid 134, which may be the two-dimensional floor plan, may include the points 132*a-d* a projected onto the plane of the floor plan. The grid 134 may alternatively be three dimensional.

In one example, the grid module 39 may access a floor plan including a grid from the building model at act S114. In another example, the grid module 39 may generate a uniform grid that is overlaid with the building model. The uniform grid includes equally spaced cells of a predetermined length and width. The uniform grid is populated according to the captured coordinates that are index on the grid. The grid module 39 records multiple sets of captured coordinates and organizes them according to the grid.

The grid may include captured coordinates from multiple observations from multiple mobile devices 122. The micro point addressing controller 121 may assign the observations to the associated portions of the grid. Ultimately, the grid provides relative locations for the micro point address assignments, which is described with respect to act S121.

In one example the grid 134 is overlaid on a vertical plane (e.g., vertical wall of the building). The points 132*a-d* may be assigned to cells of the grid 134 in a direction across the vertical plane. For example, in sequence from east to west or west to east, increasing or decreasing gradually. The sequence of the points 132*a-d* may be indexed according to a difference between the longitude closest to Greenwich mean time (GMT) and the longitude furthest away from it from the captured set of coordinates as provided by the doorbell sound trigger. The eastern or the western most longitude from GMT may be referenced as point 132*a* in the grid system and the longitude may be provided to the grids of subsequent letters moving away from the GMT. Other more extendible identifiers may be assigned to each door, for example a unique hash ID based on building address, floor and grid block identifier. In one example, the points 132*a-d* are indexed in the north to south or south to north direction. The points 132*a-d* may include a number of degrees east or west the door is from 0 degree longitude.

The micro point addressing controller 121 may store the captured coordinates triggered by the detection of the doorbell in a relational database (e.g., database 123). The micro address may be stored in relation to grid 134 initially, and then subsequently in real word coordinates in database 123. Table 1 illustrates an example include real word coordinates (latitude and longitude), a grid identifier, a floor number identifier, an address, and a user identifier (email address).

TABLE 1

| Latitude | Longitude | House Grid ID | Floor No | Address | Email Id |
|---|---|---|---|---|---|
| 12.4567 | 13.5689 | A | 6 | XYZ building, HHH street | abc@xyz.com |

Note that the attributes aren't all necessarily available from the collection process above. For instance, the e-mail address, the name associated with the doorway or a numbering of the doorways following a building-specific may not be determined in one or more of the embodiments described herein.

In some examples, the mobile device 122 may be the delivery device 126 including one or more hardware components specialized for the delivery of packages. Examples for the delivery device 126 may include hand-held computers for delivery services such as a delivery information acquisition device include one or more components for electronic proof of delivery ("ePOD"). The delivery device 126 may scan a package (e.g., using image sensor 102) to determine the micro portion address directly from the package.

The delivery device 126 may communicate with the server 125 for instructions regarding the delivery of one or more packages. The server 125 may send a package delivery message to the delivery device 126. The package delivery message may include an address portion. The address portion may include the mailing address or delivery address provided by the user when requesting the package delivery. In other words, the address portion may be user-provided and the address portion may be independent of the detected locations or location data.

When the mobile device 122 is the delivery device 126, the micro point addressing controller 121 assigns the address from the address portion to the captured coordinates in act S113. Acts S114, S115, S117, and S119 may be omitted in these embodiments.

In one example, the package delivery message may include a user identification portion. The user may have provided an email address or phone number when requesting the package delivery, which is stored in the user identification portion. After the audio is detected and matched in act S107 and coordinates are captured at act S113, the micro point address may be stored in association with the user identification data. The delivery device 126 may cause the association of the micro point address with the email, phone number, or name. This enables a query to the updated database, allowing to find an address by name, email or phone number, returning a coordinate pair and/or a precise address within a building.

Act S123 and act S125 make up a routing algorithm performed using the micro point address stored in the database 123 in response to the determination of act S123, which may be performed by the routing module 40.

At act S123, the micro point addressing controller 121 may perform an address search by querying the database 123. A request for routing, including the micro point address, may be received at the mobile device 122, which may be a different mobile device than the device that collected the audio data 31. The request may be processes at the mobile device 122 or forwarded to the server 125 for querying the database 123. In response, the database 123 provides the captured coordinates that were collected in response to the template match for the sound of the doorbell.

At act S125, the micro point addressing controller 121 may calculate a route to the destination. In one example, the routing is generated along the map data of the map database to the extent possible. Final stages of the route may be shown using the matched grid (e.g., grid 131) or on the building plan or otherwise describing the location of the detected coordinates. For example, routing from source address to updated destination address takes starts based on the coordinates. The routing may be displayed on map until no coverage zone (NCZ) is reached, i.e., inside of a building. Upon reaching NCZ, e.g. voice navigation starts based on the grid or other three-dimensional model.

Figure 7:
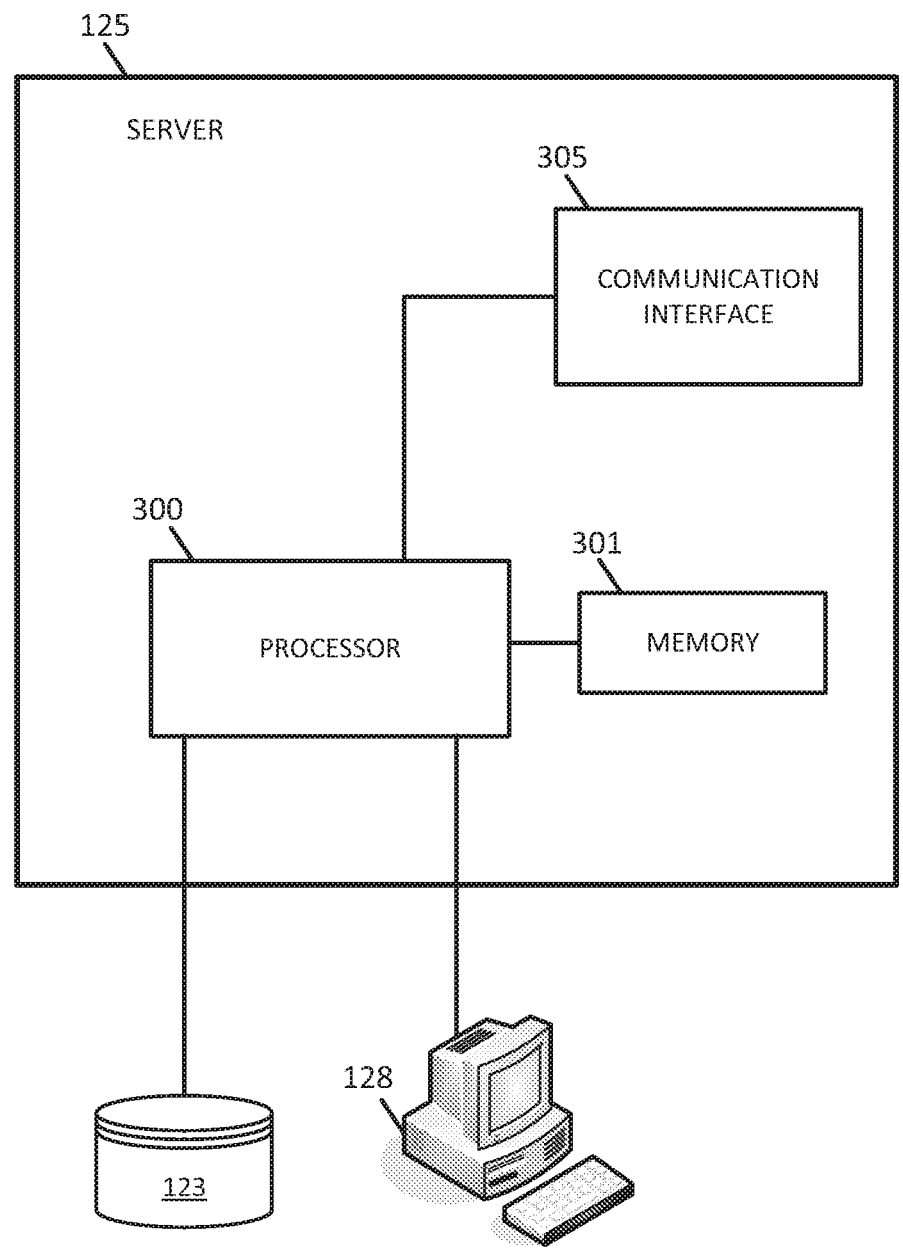
FIG. 7 illustrates an example server for the system of FIG. 1.

FIG. 7 illustrates an example server implementation of the micro point addressing controller 121. FIG. 7 illustrates an example server 125, which may apply to the system of FIG. 1. The server 125 includes a processor 300, a communication interface 305, a memory 301, and a database 123. An input device (e.g., keyboard or personal computer 128) may be used to enter settings to the server 125. The settings may include settings for thresholds and other user preferences described herein. Additional, different, or fewer components may be provided in the server 125.

Figure 8:
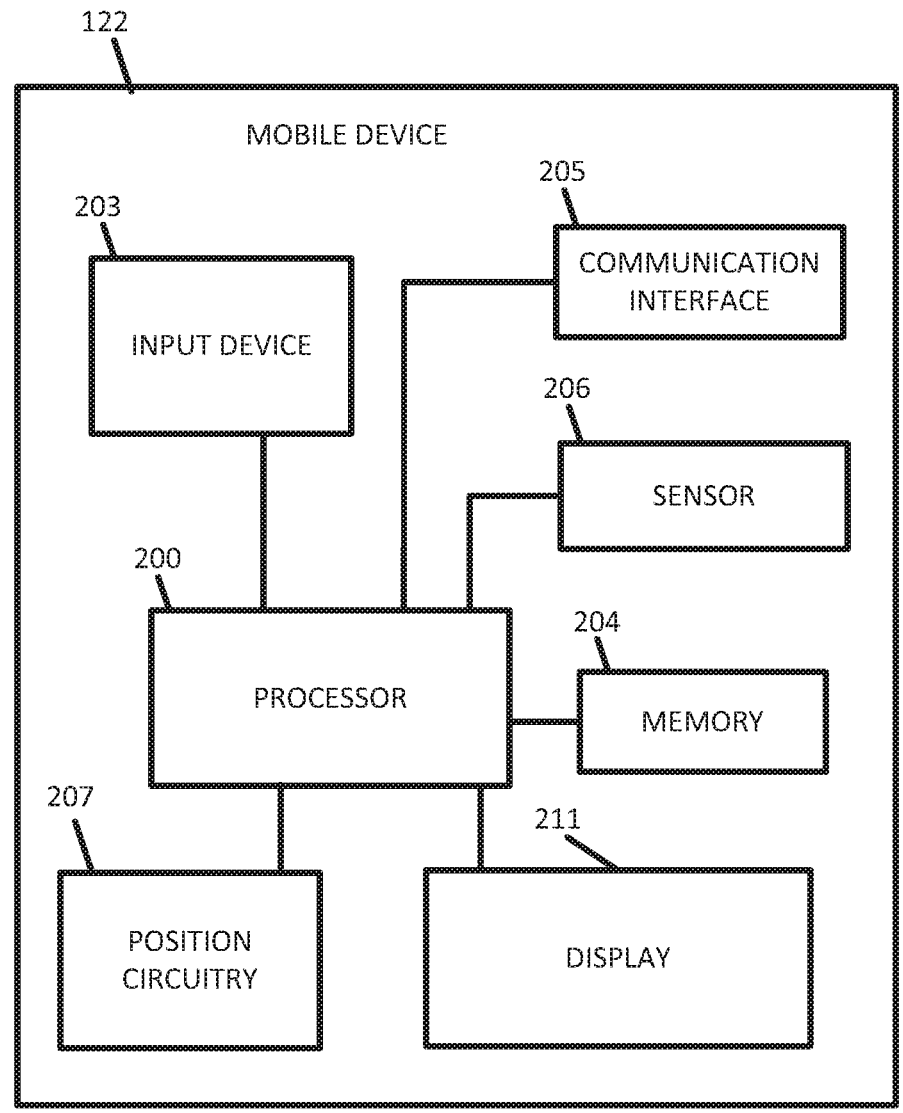
FIG. 8 illustrates an example mobile device for the system of FIG. 1.

FIG. 8 illustrates an example mobile device implementation of micro point addressing controller 121. FIG. 8 illustrates an exemplary mobile device 122 of the system of FIG. 1. The mobile device 122 includes a processor 200, a memory 204, an input device 203, a communication interface 205, position circuitry 207, a display 211, and a sensor array 206. The sensor array 206 may include a microphone and/or a camera or another imaging device. The input device 203 may receive commands from the user for default settings for the micro point address detection.

Figure 9:
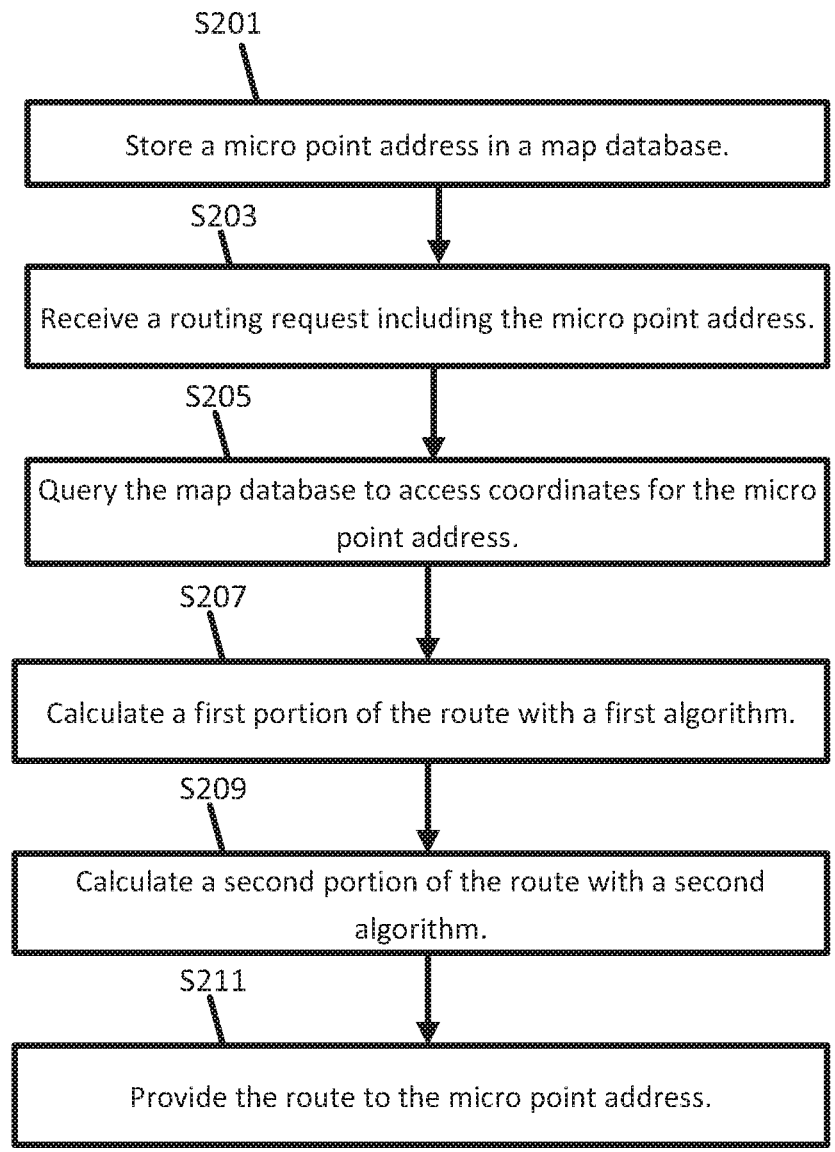
FIG. 9 illustrates an example flow chart for the operations of the server and/or the mobile device.

FIG. 9 illustrates an example flow chart for the operations of the server 125 in response to data collected by the mobile device 122. Additional, different, or fewer acts may be included.

At act S201, processor 300 stores coordinates for a micro point address in a map database 123. The coordinates are collected in response to audio collected and matched to a predetermined template as described in other embodiments herein. The audio may be collected by the mobile device 122, for example, by a microphone of the sensor array 206. The processor 300 may compare the collected audio to a template to identify a doorbell and determine the micro point address in response to the comparison or identification. The micro point address may be determined through a detection of the address, such as through an image collected by a camera of the sensor array 206. The micro point address may be downloaded from information associated with a package or through scanning the package by a scanner of the sensor array 206. The processor 300 may verify the micro point address collected in response to the audio collected and matched with the template by comparison with the information associated with the package or through scanning the package by the scanner. In response to the comparison with the template or the identification of the doorbell, the position circuitry 207 may collect geographic coordinates for the micro point address. The database 123 or the processor 300 are example means for storing coordinates for a micro point address.

At act S203, the communication interface 305 receives a routing request including the micro point address. The routing request may be entered in input device 203. The routing request includes an apartment value, a unit value, a suite value, or another indicator that is more specific than a street address. The communication device is an example means for receiving a routing request including the micro point address.

At act S205, the processor 300 queries the map database 123 according to the micro point address to access coordinates associated with the micro point address. The coordinates were previously collected by the position circuitry 207 in response to the audio template match. The processor 300 is a specialized processor or includes a module as an example means for querying the map database according to the micro point address.

At act S207, the processor 300 calculates a first portion of the route using a first routing algorithm. The first routing algorithm may be based on a road network stored in the database 123. The first routing algorithm may be a Dijkstra algorithm, an A-star algorithm or search, and/or other route exploration or calculation algorithms that may be modified to take into consideration assigned cost values of the underlying road segments. The cost values may be related to the length, speed limit, traffic, curvature, elevation, or other attributes of the road segments. Alternatively, the first portion of the route is calculated at the mobile device 122 by the processor 200.

The first portion of the route may terminate at a limited coverage zone. The limited coverage zone may be a geographic area or indoor environment where accurate positioning through GNSS is unavailable. The database 123 may include designated areas for the limited coverage zone that define the end of the first routing algorithm.

The processor 300 is a specialized processor or includes a module as is an example means for calculating a first portion of the route using a first routing algorithm.

At act S209, the processor 300 calculates a second portion of the route using a second routing algorithm. The second portion of the route originates at the limited coverage zone. The limited coverage zone may start at a building's doorway. When traveling the route, the mobile device 122 may report location data at the edge of the limited coverage zone. In response to the location data, the grid identifier for this location at the end of the first portion of the route is determined. The grid identifier becomes the origin for the second routing algorithm.

The second routing algorithm may follow a path of the mobile device 122 in collection of the micro point address. The second routing algorithm may include a route provided by indoor positioning such as based on the signal strength of wireless signals in the indoor environment. The processor 300 is a specialized processor or includes a module as is an example means for calculating a second portion of the route using a second routing algorithm.

At act S211, the processor 300 or the communication device 305 provides the route, based on the first routing algorithm and the second routing algorithm, to the micro point address using the coordinates from the database 123. The route may be provided to the mobile device 122 from the server 125 through the communication devices 205 and 305 and the network 127. The route may be provided at the mobile device 122 by the display 211. The route may be provided by voice message and a speaker. the processor 300 or the communication device 305 are example means for providing a route to the micro point address using the coordinates from the database.

The mobile device 122 may be a personal navigation device ("PND"), a portable navigation device, a mobile phone, a personal digital assistant ("PDA"), a watch, a tablet computer, a notebook computer, and/or any other known or later developed mobile device or personal computer. The mobile device 122 may also be an automobile head unit, infotainment system, and/or any other known or later developed automotive navigation system. Non-limiting embodiments of navigation devices may also include relational database service devices, mobile phone devices, car navigation devices, and navigation devices used for air or water travel.

The geographic database 123 may include map data representing a road network or system including road segment data and node data. The road segment data represent roads, and the node data represent the ends or intersections of the roads. The road segment data and the node data indicate the location of the roads and intersections as well as various attributes of the roads and intersections. Other formats than road segments and nodes may be used for the map data. The map data may include structured cartographic data or pedestrian routes. The map data may include map features that describe the attributes of the roads and intersections. The map features may include geometric features, restrictions for traveling the roads or intersections, roadway features, or other characteristics of the map that affects how vehicles or mobile device 122 travel through a geographic area. The geometric features may include curvature, slope, or other features. The curvature of a road segment describes a radius of a circle that in part would have the same path as the road segment. The slope of a road segment describes the difference between the starting elevation and ending elevation of the road segment. The slope of the road segment may be described as the rise over the run or as an angle. The geographic database 123 may also include other attributes of or about the roads such as, for example, geographic coordinates, street names, address ranges, speed limits, turn restrictions at intersections, and/or other navigation related attributes (e.g., one or more of the road segments is part of a highway or toll way, the location of stop signs and/or stoplights along the road segments), as well as points of interest (POIs), such as gasoline stations, hotels, restaurants, museums, stadiums, offices, automobile dealerships, auto repair shops, buildings, stores, parks, etc. The databases may also contain one or more node data record(s) which may be associated with attributes (e.g., about the intersections) such as, for example, geographic coordinates, street names, address ranges, speed limits, turn restrictions at intersections, and other navigation related attributes, as well as POIs. The geographic data may additionally or alternatively include other data records such as, for example, POI data records, topographical data records, cartographic data records, routing data, and maneuver data.

The geometric features may include curvature, slope, or other features. The curvature of a road segment describes a radius of a circle that in part would have the same path as the road segment. The slope of a road segment describes the difference between the starting elevation and ending elevation of the road segment. The slope of the road segment may be described as the rise over the run or as an angle.

The restrictions for traveling the roads or intersections may include turn restrictions, travel direction restrictions, speed limits, lane travel restrictions or other restrictions. Turn restrictions define when a road segment may be traversed onto another adjacent road segment. For example, when a node includes a "no left turn" restriction, vehicles are prohibited from turning left from one road segment to an adjacent road segment. Turn restrictions may also restrict that travel from a particular lane through a node. For example, a left turn lane may be designated so that only left turns (and not traveling straight or turning right) is permitted from the left turn late. Another example of a turn restriction is a "no U-turn" restriction.

Travel direction restriction designate the direction of travel on a road segment or a lane of the road segment. The travel direction restriction may designate a cardinal direction (e.g., north, southwest, etc.) or may designate a direction from one node to another node. The roadway features may include the number of lanes, the width of the lanes, the functional classification of the road, or other features that describe the road represented by the road segment. The functional classifications of roads may include different levels accessibility and speed. An arterial road has low accessibility but is the fastest mode of travel between two points. Arterial roads are typically used for long distance travel. Collector roads connect arterial roads to local roads. Collector roads are more accessible and slower than arterial roads. Local roads are accessible to individual homes and business. Local roads are the most accessible and slowest type of road.

Figure 10:
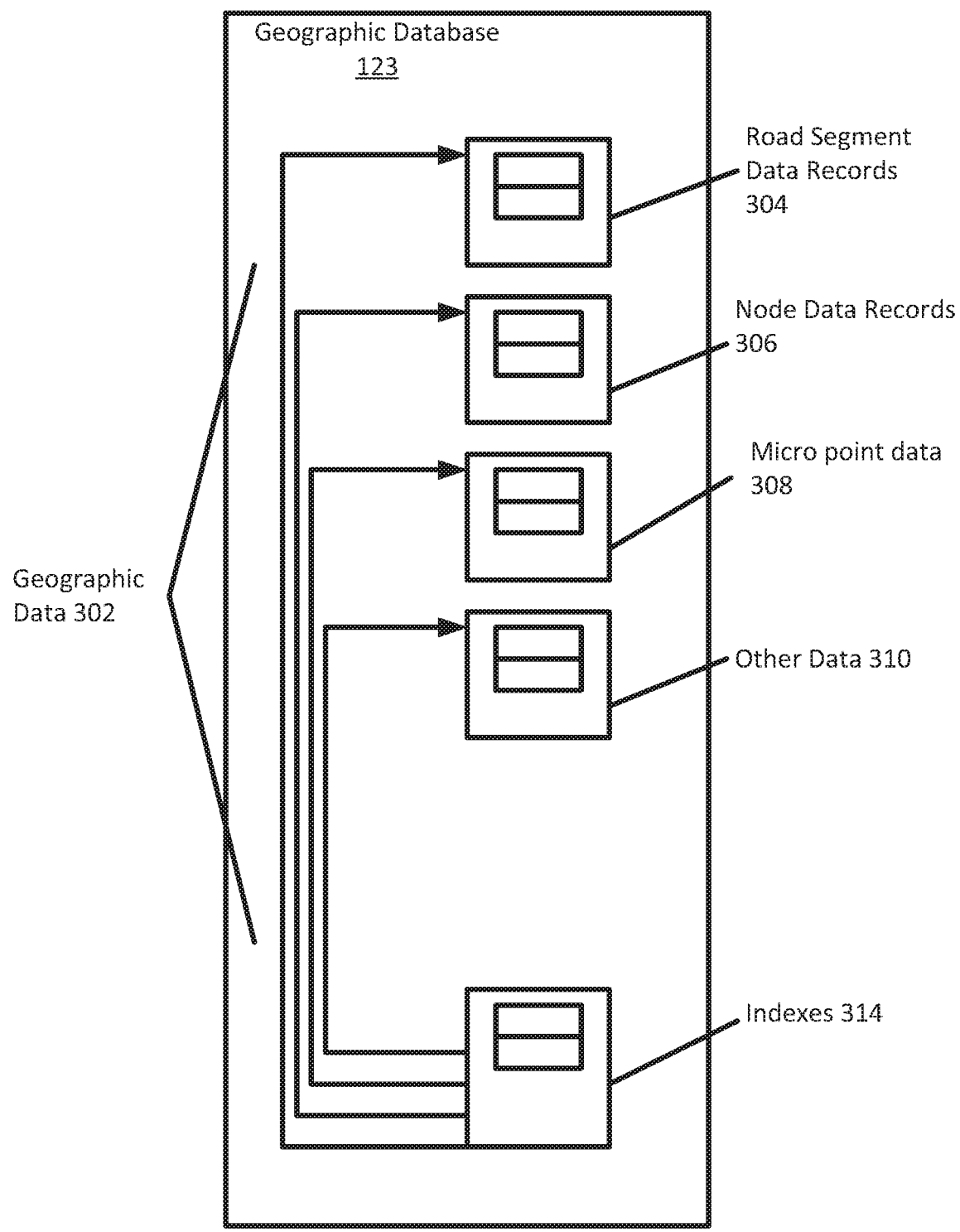
FIG. 10 illustrates an example geographic database.

In FIG. 10, the geographic database 123 may contain at least one road segment database record 304 (also referred to as "entity" or "entry") for each road segment in a particular geographic region. The geographic database 123 may also include a node database record 306 (or "entity" or "entry") for each node in a particular geographic region. The terms "nodes" and "segments" represent only one terminology for describing these physical geographic features, and other terminology for describing these features is intended to be encompassed within the scope of these concepts. The geographic database 123 may also include location fingerprint data for specific locations in a particular geographic region.

The geographic database 123 may include other kinds of data 310. The other kinds of data 310 may represent other kinds of geographic features or anything else. The other kinds of data may include POI data. For example, the POI data may include POI records comprising a type (e.g., the type of POI, such as restaurant, hotel, city hall, police station, historical marker, ATM, golf course, etc.), location of the POI, a phone number, hours of operation, etc.

The geographic database 123 also includes indexes 314. The indexes 314 may include various types of indexes that relate the different types of data to each other or that relate to other aspects of the data contained in the geographic database 123. For example, the indexes 314 may relate the nodes in the node data records 306 with the end points of a road segment in the road segment data records 304.

As another example, the indexes 314 may relate micro point data 308 (e.g., an address within a building or complex that is different than the address of the building) with a building address tied to a road segment in the segment data records 304 or a geographic coordinate.

The processor 200 and/or processor 300 may include a general processor, digital signal processor, an application specific integrated circuit (ASIC), field programmable gate array (FPGA), analog circuit, digital circuit, combinations thereof, or other now known or later developed processor. The processor 200 and/or processor 300 may be a single device or combinations of devices, such as associated with a network, distributed processing, or cloud computing.

The memory 204 and/or memory 301 may be a volatile memory or a non-volatile memory. The memory 204 and/or memory 301 may include one or more of a read only memory (ROM), random access memory (RAM), a flash memory, an electronic erasable program read only memory (EEPROM), or other type of memory. The memory 204 and/or memory 801 may be removable from the mobile device 122, such as a secure digital (SD) memory card.

The communication interface 205 and/or communication interface 305 may include any operable connection. An operable connection may be one in which signals, physical communications, and/or logical communications may be sent and/or received. An operable connection may include a physical interface, an electrical interface, and/or a data interface. The communication interface 205 and/or communication interface 305 provides for wireless and/or wired communications in any now known or later developed format.

The databases 123 may include geographic data used for traffic and/or navigation-related applications. The geographic data may include data representing a road network or system including road segment data and node data. The road segment data represent roads, and the node data represent the ends or intersections of the roads. The road segment data and the node data indicate the location of the roads and intersections as well as various attributes of the roads and intersections. Other formats than road segments and nodes may be used for the geographic data. The geographic data may include structured cartographic data or pedestrian routes.

The input device 203 may be one or more buttons, keypad, keyboard, mouse, stylus pen, trackball, rocker switch, touch pad, voice recognition circuit, or other device or component for inputting data to the mobile device 122. The input device 203 and display 211 may be combined as a touch screen, which may be capacitive or resistive. The display 211 may be a liquid crystal display (LCD) panel, light emitting diode (LED) screen, thin film transistor screen, or another type of display. The output interface of the display 211 may also include audio capabilities, or speakers. In an embodiment, the input device 203 may involve a device having velocity detecting abilities.

The positioning circuitry 207 may include suitable sensing devices that measure the traveling distance, speed, direction, and so on, of the mobile device 122. The positioning system may also include a receiver and correlation chip to obtain a GPS signal. Alternatively or additionally, the one or more detectors or sensors may include an accelerometer and/or a magnetic sensor built or embedded into or within the interior of the mobile device 122. The accelerometer is operable to detect, recognize, or measure the rate of change of translational and/or rotational movement of the mobile device 122. The magnetic sensor, or a compass, is configured to generate data indicative of a heading of the mobile device 122. Data from the accelerometer and the magnetic sensor may indicate orientation of the mobile device 122. The mobile device 122 receives location data from the positioning system. The location data indicates the location of the mobile device 122.

The positioning circuitry 207 may include a Global Positioning System (GPS), Global Navigation Satellite System (GLONASS), or a cellular or similar position sensor for providing location data. The positioning system may utilize GPS-type technology, a dead reckoning-type system, cellular location, or combinations of these or other systems. The positioning circuitry 207 may include suitable sensing devices that measure the traveling distance, speed, direction, and so on, of the mobile device 122. The positioning system may also include a receiver and correlation chip to obtain a GPS signal. The mobile device 122 receives location data from the positioning system. The location data indicates the location of the mobile device 122.

The position circuitry 207 may also include gyroscopes, accelerometers, magnetometers, or any other device for tracking or determining movement of a mobile device. The gyroscope is operable to detect, recognize, or measure the current orientation, or changes in orientation, of a mobile device. Gyroscope orientation change detection may operate as a measure of yaw, pitch, or roll of the mobile device.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry. In an embodiment, a vehicle may be considered a mobile device, or the mobile device may be integrated into a vehicle.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored. These examples may be collectively referred to as a non-transitory computer readable medium.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

The following example embodiments of the invention are also disclosed:

Embodiment 1

A method for micro point address detection in response to an audio trigger, the method further comprising:
  receiving audio data at a mobile device;
  receiving location data for the mobile device;
  performing, using a processor, a comparison the audio data to at least one predetermined audio sample; and
  associating the location data with a grid location identifier in response to the comparison.

Embodiment 2

The method of embodiment 1, further comprising:
  storing a micro point address with the location data.

Embodiment 3

The method of embodiment 1 or 2, wherein the micro point address includes a unit indicator, a suite indicator, a room indicator, or a floor indicator.

Embodiment 4

The method of any of embodiments 1 to 3, further comprising:
  extracting the micro point address from a navigation request at the mobile device.

Embodiment 5

The method of any of embodiments 1 to 4, further comprising:
  scanning a package with an image sensor; and
  determining the micro point address from the package.

Embodiment 6

The method of any of embodiments 1 to 5, further comprising:
  receiving a navigation request including the micro point address; and
  generating a route to the micro point address based on the location data.

Embodiment 7

The method of any of embodiments 1 to 6, wherein the route includes a first portion of the route using a first routing algorithm a second portion of the route using a second routing algorithm.

Embodiment 8

The method of any of embodiments 1 to 7, wherein the first portion of the route terminates at a limited coverage zone and the second portion of the route originates at the limited coverage zone.

Embodiment 9

The method of any of embodiments 1 to 8, further comprising:
  identifying a doorbell in response to the comparison.

Embodiment 10

The method of any of embodiments 1 to 9, further comprising:
  identifying a floor number based on the location data.

Embodiment 11

The method of any of embodiments 1 to 10, wherein the location data corresponds to an indoor radio map for the floor number.

Embodiment 12

The method of any of embodiments 1 to 11, wherein the location data includes altitude data, the method further comprising:
  identifying a floor dimension; and
  calculating a floor number based on an identified nearby location height for the location data and the floor dimension, wherein the floor number is stored is association with the grid location identifier.

Embodiment 13

An apparatus, configured to perform and/or control the method of any of embodiments 1-12 or comprising means for performing and/or controlling any of embodiments 1-12.

Embodiment 14

An apparatus, comprising at least one processor and at least one memory including computer program code for one or more programs, the at least one memory and the computer program code configured to, with the at least one processor, to perform and/or control the method of any of embodiments 1-12.

Embodiment 15

A computer program comprising instructions operable to cause a processor to perform and/or control the method of any of embodiments 1-12, when the computer program is executed on the processor.

We claim:

1. A method for micro point address detection in response to an audio trigger, the method further comprising:
   receiving audio data at a mobile device;
   receiving location data for the mobile device;
   performing, using a processor, a comparison of the audio data to at least one predetermined audio sample;
   identifying a doorbell in response to the comparison; and
   storing a micro point address with the location data.

2. The method of claim 1, wherein the micro point address includes a unit indicator, a suite indicator, a room indicator, or a floor indicator.

3. The method of claim 1, wherein the location data for the mobile device is determined based on radio mapping using signal strength from one or more transmitters.

4. The method of claim 1, further comprising:
   scanning a package with an image sensor; and
   determining the micro point address from the package.

5. The method of claim 1, further comprising:
   receiving a navigation request including the micro point address; and
   generating a route to the micro point address based on the location data.

6. The method of claim 5, wherein the route includes a first portion of the route using a first routing algorithm a second portion of the route using a second routing algorithm.

7. The method of claim 6, wherein the first portion of the route terminates at a limited coverage zone and the second portion of the route originates at the limited coverage zone.

8. The method of claim 1, further comprising:
   identifying a floor number based on the location data.

9. The method of claim 8, wherein the location data corresponds to an indoor radio map for the floor number.

10. The method of claim 1, further comprising:
    associating the location data with a grid location identifier in response to the comparison.

11. The method of claim 10, the method further comprising:
    identifying a floor dimension; and
    calculating a floor number based on an identified nearby location height for the location data and the floor dimension, wherein the floor number is stored in association with the grid location identifier.

12. The method of claim 1, wherein performing the comparison of the audio data to at least one predetermined audio sample further comprises:
    performing a comparison of the audio data to a plurality of predetermined doorbell templates.

13. An apparatus for micro point address detection in response to an audio trigger, the apparatus further comprising:
    an audio sensor configured to collect audio data;
    position circuitry configured to collect location data; and
    a controller configured to perform a comparison of the audio data to at least one predetermined audio template, identify a doorbell in response to the comparison, and store a micro point address in association with the location data in response to the comparison.

14. The apparatus of claim 13, wherein the at least one predetermined audio template includes a plurality of audio templates that vary with respect to frequency, distance, or sequence of sounds.

15. The apparatus of claim 13, wherein the controller identifies the micro point address from reverse geocoding of the location data, a user input, or image processing of image data.

16. A method for micro point address detection in response to an audio trigger, the method further comprising:
    receiving data associated with a doorbell at a mobile device;
    performing, using a processor, a comparison the data associated with the doorbell to at least one template;
    receiving location data for the mobile device;
    when there is a match between the data associated with the doorbell and the at least one template, identifying a doorbell in response to the comparison; and
    storing a micro point address for the location data in response to the identified doorbell.

17. The method of claim 16, wherein the at least one template is included in a plurality of doorbell templates having different ranges of frequencies or different distances.

18. The method of claim 16, wherein the location data for the mobile device is determined based on radio mapping using signal strength from one or more transmitters.

19. The method of claim 16, wherein the data associated with the doorbell includes an identifier for a type of doorbell, wherein the location data is accessed based on the identifier.

20. The method of claim 16, wherein, when there is not a match between the data associated with the doorbell and the at least one template, storing the data associated with the doorbell as a new template.

* * * * *